United States Patent [19]

Griepentrog et al.

[11] 3,801,856

[45] Apr. 2, 1974

[54] INSTANT-ON CIRCUIT FOR A TELEVISION RECEIVER

[75] Inventors: Dal Frank Griepentrog; Robert Joseph Gries, both of Indianapolis, Ind.

[73] Assignee: RCA Corporation, New York, N.Y.

[22] Filed: May 10, 1972

[21] Appl. No.: 252,314

[52] U.S. Cl. .................. 315/20

[51] Int. Cl. .................. H01j 29/70

[58] Field of Search ......... 315/27 GD, 27 TD, 27 R, 315/20, 30, 30 R, 31 R; 178/DIG. 11

[56] References Cited

UNITED STATES PATENTS

| | | | |
|---|---|---|---|
| 3,462,640 | 8/1969 | Eltgroth | 315/20 |
| 3,452,244 | 6/1969 | Dietz | 315/27 R |
| 3,535,445 | 10/1970 | Griffery | 315/30 |

*Primary Examiner*—Maynard R. Wilbur
*Assistant Examiner*—J. M. Potenza
*Attorney, Agent, or Firm*—Eugene M. Whitacre; Charles I. Brodsky

[57] ABSTRACT

The instant-on circuit cooperates with a horizontal deflection system of the type utilizing two bi-directionally conductive switching means which serve respectively as trace and commutating switches. When the on-off control for the television receiver is turned to its "ON" position, the two switches cooperate to provide those direct potentials needed for image reproduction on the face of a picture tube kinescope. When the control is turned to its "OFF" position, on the other hand, the trace switch is inactivated, but the commutating switch continues to operate to provide a reduced filament voltage for the picture tube.

7 Claims, 1 Drawing Figure

PATENTED APR 2 1974 3,801,856
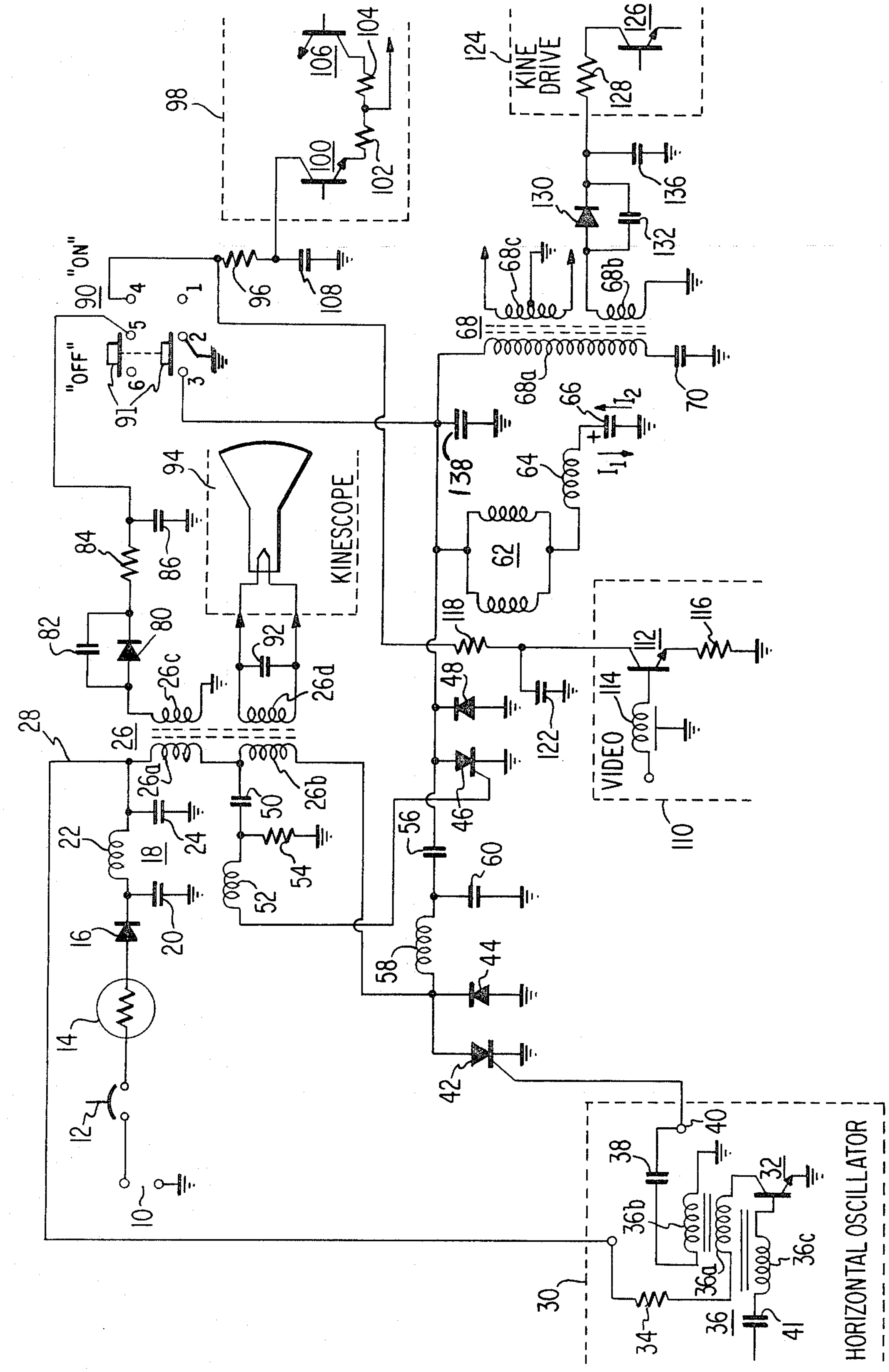

INSTANT-ON CIRCUIT FOR A TELEVISION RECEIVER

BACKGROUND OF THE INVENTION

This invention relates to an instant-on circuit for a solid state television receiver and, more particularly, to such a circuit for use in a receiver of the type utilizing two bi-directionally conductive switching means which serve respectively as trace and commutating switches. Such a switching arrangement is described in U.S. Pat. No. 3,452,244, for example, where each of the switching means comprises a parallel combination of silicon controlled rectifier (SCR) and a semiconductor diode, and where both of the switching means cooperate to provide the needed horizontal deflection and high voltage for the picture tube kinescope.

SUMMARY OF THE INVENTION

As will become clear hereinafter, the present invention is particularly attractive in combination with the deflection circuit of such U.S. Pat. No. 3,452,244 in that by adding a winding to a transformer utilized therein, a filament voltage can be developed for the kinescope without employing a separate step-down transformer. More specifically—and in accordance with the invention—, an additional winding is provided on the reactor which triggers the trace SCR, while the on-off control for the receiver is coupled across this trace switch. When the receiver is turned to its "OFF" condition, this control is closed to inhibit the generation of all direct voltages, except for that provided the horizontal oscillator of the receiver. The oscillator thus continues to gate the commutating switch to permit the generation of a filament voltage for the picture tube kinescope. However, the effective-short circuiting of the trace switch by the control in its closed position changes the tuning of the commutation circuit, and thereby reduces the filament voltage that would normally be generated and applied to the kinescope. When the receiver is then turned to its "ON" condition, the control is placed in its open position, and the filament voltage will increase to its normal value. This causes the kinescope to rise to its full emission capability, and with a rapidity sufficiently close to that of the various signal processing stages to warrant the "instant-on" characterization.

BRIEF DESCRIPTION OF THE DRAWING

These and other features of the invention will be more clearly understood from a consideration of the following description taken in connection with the single FIGURE of the drawing showing a preferred embodiment of an instant-on circuit for a television receiver employing SCR deflection, as constructed in accordance with the present invention.

DETAILED DESCRIPTION OF THE DRAWING

In the drawing, the alternating current power source for the receiver is represented by the terminals 10, to which a circuit breaker 12 and a thermistor 14 are serially coupled. The thermistor 14 serves to limit the peak alternating current which flows when the receiver is first connected to the AC line, with the thermistor 14 being followed by a semiconductor rectifier 16 and a pi filter 18. Such filter 18 comprises a capacitor 20, an inductor 22 and a capacitor 24 with one plate of the capacitors 20, 24 being coupled to ground and with the other plate being coupled to opposite ends of the inductor 22. With the anode electrode of rectifier 16 coupled to the thermistor 14 and with the values for these components as illustrated by the tabularization at the end of this specification, a direct voltage of approximately + 140 volts is developed at the junction of inductor 22 and capacitor 24.

Also coupled to the junction of the inductor 22 and capacitor 24 are two sections 26*a* and 26*b* of the primary winding of an input transformer 26, and a lead 28. As shown, lead 28 couples the direct voltage developed at this junction to a horizontal oscillator stage 30 to serve as the operating potential for a transistor 32 thereof. With the emitter electrode of transistor 32 grounded, and with the collector electrode coupled to receive the direct potential by means of a resistor 34 and a first winding 36*a* of a transformer 36, horizontal blocking oscillator action will result when one end of a second winding 36*b* of transformer 36 is grounded and its other end is coupled via a capacitor 38 to an output terminal 40 while appropriate input signals are applied to the base electrode of transistor 32 by means of a capacitor 41 and a third winding 36*c* of transformer 36. Such an oscillator arrangement is more fully described in the 1968 "Solid State Color Television—CTC 40 Chassis" publication of the RCA Sales Corporation of Indianapolis, Indiana.

As indicated, output terminal 40 is in turn coupled to the gate electrode of a first SCR 42, the cathode electrode of which is grounded and the anode electrode of which is coupled to the cathode of an added semiconductor diode 44 having a grounded anode electrode. This parallel combination 42, 44 comprises the commutating switch of two bi-directionally conductive switching means in accordance with the teachings of U.S. Pat. No. 3,452,244. As shown, the junction of the anode electrode of SCR 42 with the cathode electrode of diode 44 is connected to the end of winding 26*b* which is remote from winding 26*a*.

The junction of windings 26*a* and 26*b* is, in turn, also coupled to the gate electrode of a second SCR 46, across which and in oppositely poled direction a second semiconductor diode 48 is connected. More specifically, the junction between windings 26*a*, 26*b* is coupled via a series connection of a capacitor 50 and an inductor 52 to the gate electrode of SCR 46, with the junction between these two components being coupled to ground by an included resistor 54. The anode electrode of SCR 46 is coupled on the one hand to the cathode electrode of the diode 48 and, with that diode's anode electrode grounded, the parallel combination 46, 48 comprises the trace switch of the bidirectionally conductive switching means of the U.S. Pat. No. 3,452,244. With the anode electrode of SCR 46 being further coupled by a capacitor 56 and inductor 58 to the anode electrode of SCR 42, the resulting circuit configuration (as far as the bi-directionally conductive switches are concerned) appears quite similar to that disclosed in the afore-noted U.S. patent when a capacitor 60 is included to couple the junction between capacitor 56 and inductor 58 to ground.

The horizontal deflection winding yoke for the solid state receiver is indicated by the reference numeral 62, and is coupled via a linearity correcting inductor 64 and an S-shaping capacitor 66 between the anode of SCR 46 and ground. With a primary winding 68*a* of a horizontal output transformer 68 being coupled by a further capacitor 70 across the combination of deflection yoke 62, linearity inductor 64 and capacitor 66, the configuration illustrated is substantially identical to that illustrated in the U.S. patent noted.

In fact, the operation of the circuit as so far described is similar in all respects to that of this U.S. Pat. No. 3,452,244. Thus, collector electrode pulses which are coupled into the base electrode circuit of transistor 32 by transformer 36 cause the oscillator transistor 32 to be driven to cutoff. While transistor 32 is thus cutoff, the capacitor 41 discharges a pulse of current which appears in the collector electrode circuit of transistor 32 and is coupled back into the base electrode circuit through transformer 36 to initiate oscillator saturation. The trace switching means—SCR 46, diode 48—couples the S-shaping capacitor 66 across the horizontal deflection winding yoke 62 during the trace portion of each deflection cycle while the retrace switching means—SCR 42, diode 44—couples the capacitor 66 across the yoke 62 during the retrace portion. The capacitor 56 and the commutating inductor 58 are coupled between the trace and retrace switching means, with the source of direct energizing potential developed at the junction of inductor 22 with capacitor 24 being coupled to the junction of the retrace means with the inductor 58 by the relatively large inductance of the windings 26*a*, 26*b*.

As is more fully described in the above-mentioned patent, the complete horizontal deflection yoke current cycle occurs as a sequence of individual events involving different modes of horizontal circuit operation. Thus, as the trace interval of each horizontal deflection cycle is initiated, current flowing in the yoke 62 is at a maximum value due to prior circuit action involving resonant energy exchanges between inductors 58, 26*a* and 26*b*, capacitors 56 and 60, and the deflection yoke 62. Yoke current at this time flows in a direction illustrated by the arrow $I_1$, and through the trace diode 48 to impress a voltage of the indicated polarity across capacitor 66.

At the mid-point of the horizontal trace (the center of the scanned raster), the magnitude of the current $I_1$ decreases to zero and SCR 46 is triggered into conduction by the transformer winding 26b and the circuit including capacitor 50, inductor 52 and resistor 54. At this time, capacitor 66 discharges into the yoke 62—the current flow being indicated by the arrow $I_2$—to reverse-bias the diode 48 but to simultaneously forward-bias the trace SCR 46.

During the latter portion of the trace interval and prior to retrace, a pulse is developed across transformer winding 36*b* in the horizontal oscillator 30, and is applied to the gate electrode of SCR 42 to render it conductive and initiate the commutating portion of the deflection cycle. During this particular time, both SCR 46 and SCR 42 are conducting, but the current from the commutating circuit increases more rapidly than the yoke current $I_2$ so that after a very short time, the net current flowing in SCR 46 reverses to cause SCR 46 to turn off. Because the commutating circuit current momentarily becomes greater than the yoke current, diode 48 becomes forward-biased and conducts at this time. However, this conduction occurs only for a short interval, until the commutating circuit current decreases and becomes equal to the yoke current. Diode 48 then again becomes non-conductive, and the retrace interval begins.

During the first half of the retrace interval—with both SCR 46 and diode 48 in the "off" state—the resulting network comprises a series resonant circuit consisting of inductor 58, capacitor 56 and the deflection yoke 62, vernier tuned by capacitor 60. (Capacitor 66 also is in series with these components but, because of its large value, its effect can be neglected, as can be the effect provided by the linearity inductor 64.) Midway through the retrace interval, the current in the series resonant circuit decreases to zero, at which time the current reverses its direction causing SCR 42 to stop conducting as the current is in a direction opposite to the conduction direction of that rectifier. Diode 44 then becomes forward-biased to start conducting and thereby complete the circuit for the remainder of the retrace current flow. The energy which had been stored on capacitor 56 during this interval is thus returned to the deflection yoke 62. At the end of the retrace interval, the voltage which has developed across diode 48 is effective to forward bias this component and switch it to its conductive condition. This action effectively disconnects the commutating components 56, 58 from the yoke winding 62, and connects the capacitor 66 across the winding. The yoke energy then discharges into capacitor 66, starting the first half of the trace interval once again.

This complex series of energy exchanges between the reactive components illustrated is more fully detailed in U.S. Pat. No. 3,452,244, the disclosure of which is herein incorporated by reference.

As will become clear below, the arrangement of the present invention differs from that detailed in this patent by the inclusion of two additional windings on the transformer 26, and by the further insertion of the on-off control of the receiver across the trace switching means 46, 48. In particular, a third winding 26c is coupled as a secondary winding on the transformer 26, having one terminal thereof connected to ground and a second terminal coupled to the anode electrode of a diode 80, across which a capacitor 82 is coupled in parallel. The cathode electrode of diode 80 is, in turn, coupled by a filter circuit including a resistor 84 and a capacitor 86 to terminal 5 of a double-pole double-throw switch 90. With the component values set forth in the tabularization at the end of this specification, this combination of elements cooperates to provide a direct voltage at terminal 5 of approximately +44 volts, in value.

Also coupled as a secondary winding on transformer 26 is another winding 26*d*, coupled adjacent the primary winding 26*b*. Across the opposite terminals of winding 26*d*, a capacitor 92 is coupled, with a substantially rectangularly shaped alternating voltage being developed thereacross to serve as a source of filament voltage for the picture tube kinescope. Such kinescope is represented by the reference numeral 94 in the drawing.

The on-off control for the receiver is represented by the terminals 1, 2 and 3 of the double-pole double-throw (DPDT) switch 90, with the terminal 1 being unconnected, with the terminal 2 being connected to ground, and with the terminal 3 being connected to the anode electrode of SCR 46. As will become clear, the television receiver will be in its "OFF" condition when the DPDT switch 90 is adjusted to its closed position, wherein its terminals 2 and 3—and also its terminals 5 and 6 by a ganging arrangement—are connected. When the DPDT switch 90 is adjusted to connect its terminals 1 and 2—and thereby its ganged terminals 4 and 5—, the switch 90 will be in its open position and the receiver will be in its "ON" state.

As indicated, terminals 1 and 6 of the DPDT switch 90 are unconnected. Terminal 4, on the other hand, is coupled by a resistor 96 to the vertical output circuitry of the receiver 98—and, more particularly, to the collector electrode of an included transistor 100. Coupled to the emitter electrode of transistor 100 are a pair of resistors 102, 104, at whose junction the vertical output signal is developed. Resistor 104 is, in turn, coupled to the collector electrode of a second vertical transistor 106, while a filter capacitor 108 is included to couple the junction of resistor 96 and transistor 100 to ground. It will be readily apparent that in the "ON" condition of the receiver—where switch terminals 4 and 5 are connected—, the positive direct voltage developed at terminal 5 of the switch 90 is coupled to energize the transistors 100, 106 and enable the development of vertical output signals. When the receiver is in its "OFF" condition, on the other hand, no connection of the direct voltage at terminal 5 of the switch exists to its terminal 4, and no vertical output signals will therefore be developed by the then deenergized stage 98. A voltage of some +30 volts is applied to transistor 100 when terminals 4 and 5 are connected.

Also shown in the drawing are arrangements operative with the DPDT switch 90 for developing the direct energizing potential for the video stages of the television receiver and for the driver stages for its cathode-ray kinescope. To be more specific, the video section is represented by the reference numeral 110, and typically includes an amplifying stage having a transistor 112 whose base electrode is coupled via a delay line 114 to receive applied luminance signals. A resistor 116 couples the emitter electrode of transistor 112 to ground, while a resistor 118 and a filter capacitor 122 couple the collector electrode of such transistor to terminal 4 of switch 90. As with the vertical output stage 98, it will be seen that a direct voltage will be developed for the collector electrode of transistor 112 to serve as its energizing potential, only when switch 90 is adjusted to connect its terminals 4 and 5. Resistor 118 and capacitor 122 also serve to reduce the +44 volts voltage at terminal 5 to the +30 volts employed in energizing the video stage 110.

The driver stage for the kinescope 124, on the other hand, includes a transistor 126 having a collector electrode coupled by a resistor 128 to a secondary winding 68*b* of the output transformer 68. One terminal of that secondary winding is connected to ground while a second terminal is coupled to the anode electrode of a semi-conductor diode 130, across which a capacitor 132 is coupled in parallel arrangement. The cathode electrode of diode 130 will be seen to couple to the resistor 128 and to couple to ground by an included capacitor 136. As will be seen, diode 130, capacitor 132 and capacitor 136 cooperate to provide a direct energizing potential for the collector electrode of transistor 126, except when terminals 2 and 3 of the DPDT switch 90 are connected. In such instance, the series combination of the primary winding 68*a* of transformer 68 with capacitor 70 is short-circuited by the switch configuration, and no signal coupling to the secondary winding 68*b* exists to develop the needed energization for the driver 124.

Lastly, the sole FIGURE of the drawing shows a further winding 68*c* on transformer 68 to develop needed flyback pulses for the television receiver in providing automatic frequency control and high voltage generation, for example.

In operation, it will be seen that a two SCR deflection system is shown with input power being obtained from rectified line voltage. Neither a 60 Hz power transformer or filament transformer is employed, because filament voltage is obtained from an additional winding 26*d* on the input transformer 26 and because other supply voltages are obtained under the control of the double-pole double-throw switch 90. With this on-off control being arranged to connect its terminals 1 and 2 and its terminals 4 and 5, energizing voltages will be developed for the vertical output stage 98, for the video stage 110, for the kine driver circuitry 124 and for the high voltage generating stages by means of transformer winding 68c. At the same time, a direct voltage will be provided to the horizontal oscillator 30. On the other hand, with this on-off control adjusted to connect its terminals 2 and 3 and its terminals 5 and 6, operating potential is removed from the vertical output stage 98 and the video stage 110, while the resulting short circuit which then exists from the anode electrode of SCR 46 to ground, inhibits the generation of the direct voltage for the kine driver stage 124, and also inhibits high voltage generation by virtue of the effective removal of output transformer 68 from the circuit.

Although this latter adjustment of the switch 90 to its closed position thus turns the receiver to its "OFF" state, the horizontal oscillator 30 continues to be powered by the positive direct voltage developed at the junction of inductor 22 and capacitor 24. The oscillator stage 30 will thus continue to operate, as will the commutating switch circuit including SCR 42 and diode 44 so as to provide filament power via transformer windings 26*b* and 26*d* for the kinescope 94. Because of the change in timing which results in the tuning circuit including the components 56, 58 and 60 when the anode of the trace SCR 46 is shorted to ground by the switch 90, the voltage developed by the commutating circuitry will be changed, however. By selectively adjusting the values for the capacitors 56 and 60, along with the inductor 58, the resulting power applied to the kinescope 94 can be varied. With the component values set forth below, the voltage applied to the kinescope filament when the receiver is in its "ON" state (with terminals 1 and 2 and with terminals 4 and 5 of switch 90 connected) is of the order of 6 volts. During the standby condition—when the receiver is turned to its "OFF" condition, where terminals 2 and 3 and terminals 5 and 6 of switch 90 are connected—the change in timing which results causes a decrease in the applied filament voltage to about 5 volts. Such decreased voltage has been found sufficient to extend the life of the kinescope as compared to instances where a full filament voltage is continually applied in the "OFF" mode of the receiver, and permits the kinescope to rise to its full emission capability when the switch 90 turns the receiver "ON"—and, at a speed comparable to that which the then-applied direct voltages cause their respective solid state stages to respond.

Due to this change in tuning of the commutation circuit with switch 90 closed, therefore, the filament power will be reduced by approximately the proper amount for standby operation and the total power consumption of the system will be greatly reduced. Adjustment of the number of filament winding turns on transformer 26 and/or the yoke inductance can insure the proper filament voltage to be developed. Instant-on operation will then be attained by opening switch 90 so as to disconnect its terminals 2 and 3 and connect its terminals 4 and 5.

This described connection of the on-off switch 90 across the trace SCR 46 has the further advantage that any peak current through the control is reduced, as compared with that normally present during a turn-on surge with on-off controls which are connected in series with the alternating current line. Also, since the closing of the switch 90 to connect its terminals 2 and 3 instantaneously inhibits the generation of any high voltage at transformer 68 before the other supply voltages decay, the ultor capacitance of the kinescope will be more completely discharged, and previously employed high voltage bleeder resistors may no longer be required.

The following component values have been employed in an embodiment of the present invention according to the foregoing description, and provided circuit operation in the manner described above. It will be understood, however, that these component values are set forth merely for purposes of illustration.

| | |
|---|---|
| Resistor 34 | 5.6 kilohms |
| Resistor 54 | 270 ohms |
| Resistor 84 | 4.7 ohms |
| Resistor 96 | 18 ohms |
| Resistor 102 | 0.1 ohms |
| Resistor 104 | 0.3 ohms |
| Resistor 116 | 3.9 kilohms |
| Resistor 118 | 68 ohms |
| Resistor 128 | 10 kilohms |
| Capacitor 20 | 750 microfarads |
| Capacitor 24 | 175 microfarads |
| Capacitor 38 | 0.15 microfarads |
| Capacitor 50 | 0.18 microfarads |
| Capacitor 56 | 0.75 microfarads |
| Capacitor 60 | 0.047 microfarads |
| Capacitor 66 | 2.5 microfarads |
| Capacitor 82 | 390 micromicrofarads |
| Capacitor 86 | 100 microfarads |
| Capacitor 92 | 390 micromicrofarads |
| Capacitor 108 | 1,000 microfarads |
| Capacitor 122 | 500 microfarads |
| Capacitor 132 | 390 micromicrofarads |
| Capacitor 136 | 10 microfarads |
| Capacitor 138 | 0.033 microfarads |
| Inductor 52 | 470 microhenries |
| Inductor 58 | 67 microhenries |
| Thermistor 14 | 40 ohms |

While there has been described what is considered to be a preferred embodiment of the present invention, it will be readily apparent that other modifications may be made by those skilled in the art without departing from the teachings herein of providing two levels of kinescope filament power combined with an on-off switching of a derived power supply. Direct voltages for the receiver are taken from the SCR deflection circuitry, but are controlled by the placement of the on-off switch of the receiver across the trace SCR.

What is claimed is:

1. In a supply circuit for powering the filament of a cathode-ray kinescope of a television receiver of the type including a horizontal oscillator and a horizontal deflection system including first and second switching means operable between conductive and nonconductive states for providing trace and retrace portions of developed horizontal deflection currents to said cathode-ray device and for generating such high voltages as are necessary for the reproduction of transmitted image signals applied to said device via included signal processing stages within said receiver, the combination comprising:

a source of alternating voltage;

first means coupling said voltage source to energize said horizontal oscillator to provide oscillation output signals to said second switching means of said horizontal deflection system for alternatively operating it and said first switching means of said deflection system in their conductive and nonconductive states in providing said deflection retrace and trace currents, respectively;

second means coupled to said second switching means for providing energizing potentials for said cathode-ray filament to power said kinescope, said potentials being of a magnitude dependent upon the relative conduction time of said second switching means in providing said retrace current as compared to that of said first switching means in providing said trace current;

third means coupled to said voltage source for providing energizing potentials for said signal processing stages for developing said image signals for reproduction;

said third means including third switching means for energizing said signal processing stages when it is desired to enable image reproduction by said television receiver and for de-energizing said signal processing stages when it is desired to disable said image reproduction, with said third switching means being additionally coupled to inactivate said first switching means providing said trace portion of horizontal deflection current when image reproduction is disabled, to alter the relative conduction times of said first and second switching means in a direction to reduce the magnitude of energizing potential continuing to be applied to said cathode-ray filament via said second switching means and said horizontal oscillator continuing to provide oscillation output signals thereto, even though said receiver is switched to its non-operative condition.

2. The combination of claim 1 wherein said first and second switching means are each bi-directionally conductive.

3. The combination of claim 4 wherein each of said first and second switching means comprises the parallel combination of a silicon controlled rectifier and a diode coupled for bi-directional current conduction by said first and second switching means.

4. The combination as defined by claim 5 wherein there is also included means for rendering the silicon controlled rectifier conductive approximately at the middle of the trace portion of said horizontal deflection current.

5. The combination as defined in claim 6 wherein the diode in said first switching means is poled for conduction of current through an included deflection winding developing said horizontal deflection signals during the first half of the trace portion thereof.

6. The combination as defined by claim 7 wherein said silicon controlled rectifier in said second switching means is poled for conduction immediately prior to and during the initial portion of said retrace interval.

7. The combination as defined in claim 8 wherein said diode in said second switching means is poled for conduction in a direction opposite to its associated silicon controlled rectifier.

* * * * *

UNITED STATES PATENT OFFICE
CERTIFICATE OF CORRECTION

Patent No. 3,801,856 Dated April 2, 1974

Inventor(s) Dal Frank Griepentrog et al.

It is certified that error appears in the above-identified patent and that said Letters Patent are hereby corrected as shown below:

Column 8, line 45, that portion reading "claim 4" should read -- claim 2 --; line 50, that portion reading "claim 5" should read -- claim 3 --; line 55, that portion reading "claim 6" should read -- claim 4 --; line 60, that portion reading "claim 7" should read -- claim 5 --; line 64, that portion reading "claim 8" should read -- claim 6 --.

Signed and sealed this 30th day of July 1974.

(SEAL)
Attest:

McCOY M. GIBSON, JR.
Attesting Officer

C. MARSHALL DANN
Commissioner of Patents